May 20, 1952  W. D. DRUMMOND  2,596,991
ROTARY DISK TO FACILITATE PLOW PENETRATION
Filed Oct. 29, 1947
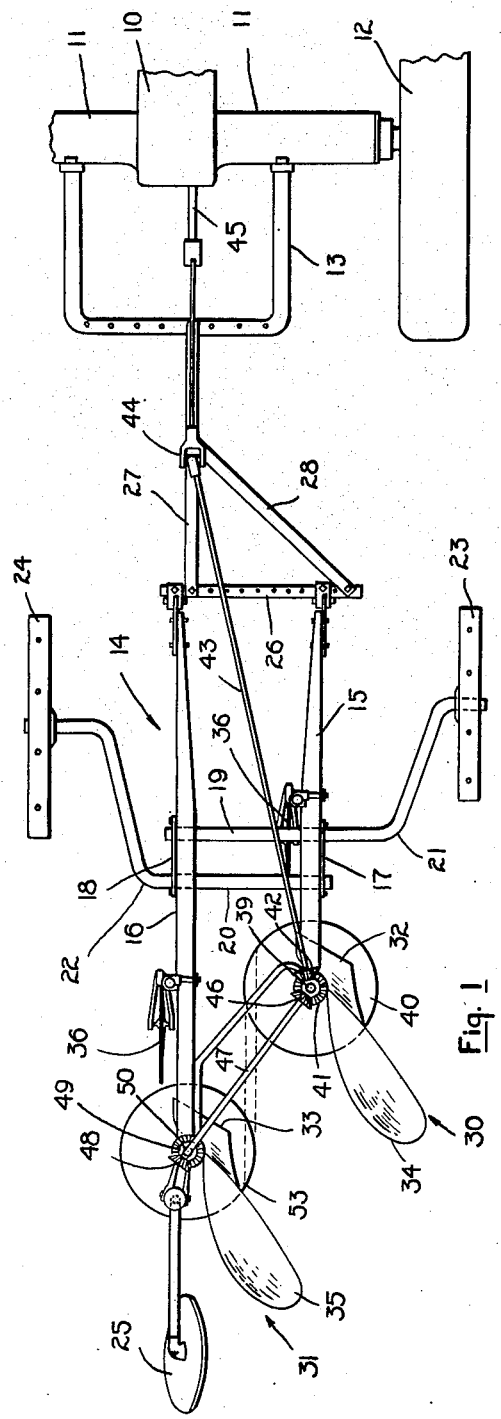
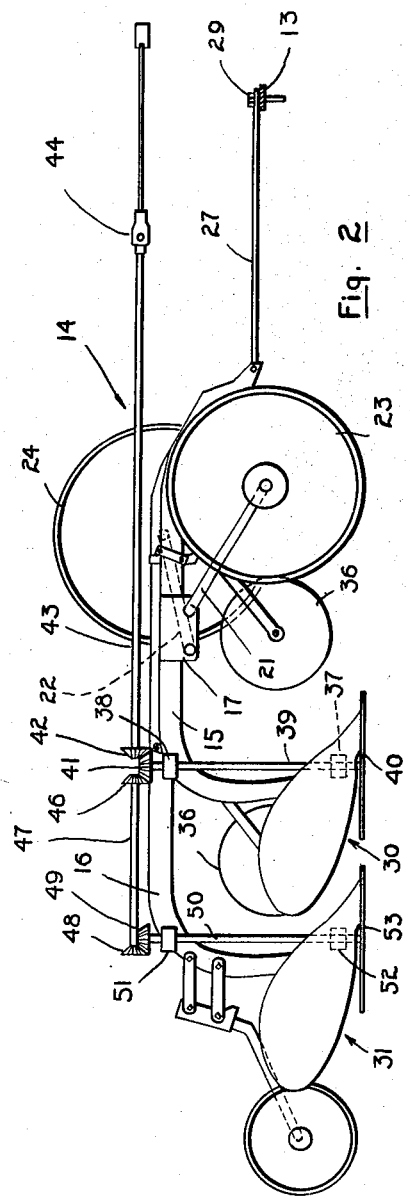
INVENTOR.
William D. Drummond
BY Paul O. Pippel
Atty.

Patented May 20, 1952

2,596,991

UNITED STATES PATENT OFFICE 2,596,991

ROTARY DISK TO FACILITATE PLOW PENETRATION

William D. Drummond, Hamilton, Ontario, Canada, assignor, by mesne assignments, to International Harvester Company, Chicago, Ill., a corporation of New Jersey Application October 29, 1947, Serial No. 782,747

3 Claims. (Cl. 97—43)

This invention relates to agricultural implements and particularly to a plow adapted to be propelled through the soil by a tractor or the like.

A plow bottom penetrates deeply into the soil and considerable power or tractive effort is required for its propulsion. When a plurality of plow bottoms are to be propelled through the soil, or when abnormally hard ground is encountered the tractive effort required is so great that slippage of the drive wheels occurs. This results in high fuel consumption as well as considerable wear and tear on the tires.

An object of the present invention is to provide a plow structure which avoids these disadvantages and which may be propelled through the soil with a minimum of tractive effort.

Another object of the invention is to provide a multibottom plow having incorporated therewith improved means for facilitating passage thereof through the soil.

A further object of the invention is to provide a tractor drawn plow comprising conventional plow bottoms and having incorporated therewith a disk to facilitate penetration of the plow bottoms in the soil, and wherein the disk is driven by tractor power.

Other objects and advantages will become clear from the following detailed description when read in conjunction with the accompanying drawings, wherein:

Figure 1 is a plan view of a two-bottom trail behind plow embodying the features of the present invention; and Figure 2 is a side elevation of the structure shown in Figure 1.

Referring to the drawings, the numeral 10 designates the body of a tractor having transverse rear axle structures 11 and rear drive wheels 12, only one of which is shown. The tractor is provided with a conventional draw bar 13 to which is connected in draft receiving relation a trail behind implement in the form of a two-bottom moldboard plow comprising a frame generally indicated by the numeral 14.

The plow of the present invention includes a pair of longitudinally extending laterally spaced plow beams 15 and 16, the latter beam being longer than beam 15 and extending rearwardly thereof. Beams 15 and 16 have secured thereto depending plates 17 and 18 respectively. These plates are provided with bearings for the reception of the transverse portions 19 and 20 of crank axles 21 and 22 respectively. Crank axle 21 has mounted thereupon a furrow wheel 23 and a land wheel 24 is mounted upon the crank axle 22.

While no lifting structure is shown, it may be understood that the crank axles 21 and 22 may be rocked in a generally vertical direction to raise and lower frame 14 with respect to the wheels 23 and 24. A conventional furrow wheel 25 is likewise provided to support the rear end of the implement.

The forward ends of the beams 15 and 16 are connected by a transversely extending draft bar 26 to which is connected a hitch bar 27 braced by another bar 28. Hitch bar 27 is pivotally connected by a pin 29 to the draw bar 13 of the tractor.

It will be noted that the beams 15 and 16 curve downwardly at their rear ends and have secured thereto, respectively, plow bottoms 30 and 31 provided respectively with earth penetrating cutting edges 32 and 33, and with earth turning moldboards 34 and 35. Conventional vertically extending rolling colters 36 are provided to extend in advance of and open a vertical path ahead of the plow bottoms 30 and 31.

As pointed out before, in an ordinary moldboard plow where the draft supplied by the tractor propels the working tools through the ground, difficulties are often encountered in the form of skidding tractor wheels when hard earth or other unusual draft conditions are encountered. According to the present invention, therefore, means are provided to lighten the draft load upon the tractor drive wheels so that the implement may be propelled more easily through the soil and this is accomplished by a mechanism now to be described.

Plow bottom 30 has secured thereto in a suitable manner a bearing 37 in vertical alignment with a bearing 38 secured to the right hand plow beam 15. Mounted in the bearings 37 and 38 is a vertically extending shaft 39 having secured to its lower end a substantially horizontally extending rotary cutting disk 40. The cutting edge of the disk 40, as will be obvious from Figure 1, extends well in advance of and to opposite sides of cutting edge 32 of plow bottom 30. The disk 40 is mounted upon the shaft 39 below the plow bottom 30 and closely adjacent thereto so that a horizontal path is opened in the earth to facilitate the penetration of the plow bottom and to ease its passage through the soil. The upper end of shaft 39 extending above the bearing 38 has mounted thereupon a bevel gear 41 which meshes with a bevel gear 42 mounted upon a horizontal shaft 43 which extends forwardly and is connected by a universal joint 44 with a power take-off shaft 45 extending rearwardly from the tractor and driven by tractor power. The operation of power take-off shaft 45 thus operates through shaft 43, bevel gears 42 and 41, and shaft 39 to rotate the horizontal disk 40.

Also in mesh with gear 41 is a bevel gear 46 mounted upon a shaft 47 which has another gear 48 secured to the end thereof. Shaft 47 extends rearwardly and laterally, and gear 48 meshes with a bevel gear 49 mounted upon the upper end of a shaft 50 which is rotatably mounted in bearings 51 and 52 secured respectively to the beam 16 and plow bottom 31. The lower end of shaft 50 is provided with a horizontally extending rotary disk 53 similar in every respect to disk 40. Disk 53 is likewise mounted directly below the plow bottom 31 and its cutting edge extends forwardly and to opposite sides of the cutting edge 33 so that disk 53 likewise penetrates the earth in advance of and prepares the way for plow bottom 31 to facilitate its penetration of the soil. As will be noted in Figure 1, the inner edge of disk 40 extends beyond and laps the inner edge of the disk 53, the amount of lap being indicated in dotted lines in Figure 1. This lapping of the disks 40 and 53 causes the two disks to open a continuous transverse path in the soil to facilitate the passage of the plow bottoms 30 and 31. Thus a part of the draft load is taken from the draw bar 13 and assumed by the power take-off shaft 45 of the tractor, and the load upon the drive wheels 12 of the tractor is thus lightened.

It is believed that the nature and function of the present invention will be clearly understood from the foregoing description. The invention has been described in its preferred embodiment and it should be understood that modifications will be made therein without departing from the spirit of the invention or the scope of the appended claims.

What is claimed is:

1. The combination with a tractor having a power take-off shaft of an agricultural implement comprising a supporting frame, a pair of laterally spaced plow bottoms mounted on the frame, each said bottom having a share portion, a vertically extending shaft carried by the frame and secured to each said plow bottom, a horizontal rotary disk mounted parallel to the ground on each shaft below and extending forwardly and to opposite sides of said share portion to penetrate the earth in advance of said plow bottom, said disks being arranged in longitudinally spaced lapping relation, and a driving connection between the power take-off shaft on the tractor and said disks for rotating the latter.

2. The combination with a tractor having a power take-off shaft of an agricultural implement comprising a supporting frame, an earth working tool mounted on the frame, a vertically extending shaft carried by the frame and secured to said tool, a horizontal rotary disk mounted on the lower end of the shaft below the tool parallel to the ground and extending forwardly of and to opposite sides thereof to penetrate the earth in advance of the tool and open a path therefor, and a driving connection between the power take-off shaft on the tractor and said disk shaft for rotating the disk.

3. The combination with a tractor having a drawbar and a power take-off shaft of an agricultural implement comprising a wheeled frame connected to the drawbar, laterally and longitudinally spaced plow bottoms carried by the frame, each said bottom having a cutting edge and a moldboard, a vertically extending shaft associated with each said bottom and secured thereto, a horizontal rotary disk mounted on each said shaft parallel to the ground having its forward cutting edge extending in advance of the cutting edge of said plow bottom to open a path therefor and facilitate its penetration of the soil, and a driving connection between said shafts and the tractor power take-off shaft.

WILLIAM D. DRUMMOND.

REFERENCES CITED

The following references are of record in the file of this patent:

UNITED STATES PATENTS

| Number | Name | Date |
|---|---|---|
| 549,507 | Evans | Nov. 12, 1895 |
| 630,367 | Lovett | Aug. 8, 1899 |
| 709,028 | Mulrony | Sept. 16, 1902 |
| 994,648 | Monaghan | June 6, 1911 |
| 1,697,679 | Davidson | Jan. 1, 1929 |
| 2,244,538 | Kasten | June 3, 1941 |

FOREIGN PATENTS

| Number | Country | Date |
|---|---|---|
| 81,535 | Germany | Oct. 25, 1920 |
| 349,706 | Germany | Mar. 6, 1922 |